Oct. 15, 1974

M. DELSA

3,841,989

ELECTROLYTIC CELL INCLUDING A PLURALITY OF ANODES
GROUPED AROUND EACH CATHODE FOR INCREASED
ELECTROLYTE CIRCULATION IN THE CELL

Filed Dec. 22, 1972

INVENTOR
MARCEL DELSA

ATTORNEYS

United States Patent Office 3,841,989
Patented Oct. 15, 1974

3,841,989
ELECTROLYTIC CELL INCLUDING A PLURALITY OF ANODES GROUPED AROUND EACH CATHODE FOR INCREASED ELECTROLYTE CIRCULATION IN THE CELL
Marcel Delsa, deceased, late of Brussels, Belgium, by Philips Jeannine Guillemine, legal representative, 200 Avenue de Tervueren, Brussels, Belgium
Continuation-in-part of abandoned application Ser. No. 42,702, June 2, 1970. This application Dec. 22, 1972, Ser. No. 317,837
Claims priority, application Luxembourg, June 3, 1969, 58,793
Int. Cl. C23b 5/68
U.S. Cl. 204—212
19 Claims

ABSTRACT OF THE DISCLOSURE

An apparatus for electrolysis, particularly designed for the manufacture of manganese dioxide. The apparatus has a container provided with a bottom wall from which anodes extend upwardly and a top wall from which cathodes extend downwardly. The anodes are arranged in groups with each group of anodes being distributed about each cathode. The several groups of anodes define between themselves spaces in which the electrolytic bath is adapted to flow in one direction, generally parallel to the anodes and cathodes, while in the interiors of the groups the bath is adapted to flow in an opposite direction along the cathodes, so that in this way a continuous circulation of the bath is achieved.

CROSS-REFERENCE TO RELATED APPLICATION

This application is a continuation-in-part of application Ser. No. 42,702, filed June 2, 1970, and now abandoned, and entitled "Electrolysis of Metals."

BACKGROUND OF THE INVENTION

This invention relates to the electrolysis of metals, and more particularly to a new and improved electrolytic cell and to the arrangement and construction of the electrodes. It applies more particularly to an electrolysis in which titanium is used as the anodic material, and more particularly for the manufacture by electrolysis of manganese dioxide.

The application of the invention to the manufacture of manganese dioxide is of particular interest. In conventional electrolysis, the anodic material has always provided serious problems. Various solutions have been proposed, each of which has serious drawbacks: graphite is fragile; lead, although of slight solubility, passes into the solution and pollutes the final product. Titanium has a very good resistance to corrosion but it may be rapidly passivated, thus limiting the production, and moreover, its price is high.

SUMMARY OF THE INVENTION

Thus, it is an object of the invention to avoid the above drawbacks.

The present invention has for one of its objects to appreciably improve the behavior of titanium as anodic material, and also to provide a new and improved cell.

Also, it is an object of the present invention to provide an apparatus which is capable of operating reliably over a long period of time to achieve a high output of manganese dioxide.

With the apparatus of the invention a container means is provided for containing an electrolytic bath, this container means having top and bottom walls. A plurality of anodes are carried by and extend upwardly from the bottom wall in the interior of the container means and a plurality of cathodes are carried by and extend downwardly from the top wall in the interior of the container means. The number of anodes is greater than the number of cathodes and the anodes are arranged in groups with each group of anodes being distributed about a single cathode. These groups of anodes adjoin each other and define between themselves predetermined spaces in which the bath is adapted to flow in one direction which is generally parallel to the anodes and cathodes while in the interiors of the groups the bath is adapted to flow in an opposite direction along the cathodes to provide continuous circulation of the bath with respect to the anodes and cathodes.

BRIEF DESCRIPTION OF DRAWINGS

The invention is illustrated by way of example in the accompanying drawings which form part of this application and in which.

DESCRIPTION OF PREFERRED EMODIMENTS

According to the invention the electrolytic cell comprises a container means (FIG. 7) having a plate forming the bottom 10 of the cell, a lid on top wall 8 to the cell, electrodes or anodes 6 of the same polarity arranged to pass through the plate forming the bottom 10 of the cell, and electrodes or cathodes 4 of opposite polarity arranged to pass through the lid.

According to another characteristic feature of the invention, the various electrodes are of a cross-sectional shape which is not plane in order to facilitate stirring or turbulence inside the elecetrolytic bath.

The current inlets are arranged outside the cell, at the upper and at the lower part thereof, to prevent any pollution of the bath by the conductors.

The anodes 6 are preferably situated at the corners of hexagonal figures described in a plane normal to the anodes and the cathodes are preferably situated at the centers of the hexagons. An additional improvement may sometimes be obtained by using irregular hexagons, according to the description given hereinafter, more particularly when manganese dioxide is manufactured.

Such an arrangement permits directly affecting six anodes for one cathode: this leads to an appreciable reduction of the cathode surfaces in the cell, which is a desired favorable factor; indeed, the ratio $$\frac{(\text{Number of anodes})}{(\text{Number of cathodes})}$$

which theoretically should be equal to 3, is in practice lower than 3.

The anodes 6 advantageously have a polygonal, elliptical, or circular cross section, thus avoiding large plane surfaces, which would disturb the hydraulic currents inside the cell. It is advantageous to use (FIG. 16) hollow cylindrical bodies of titanium, the upper part of which is closed and the inner part of which has been subjected to a reaction which causes good distribution of the electric current and ensures a good mechanical resistance.

Figure 16:
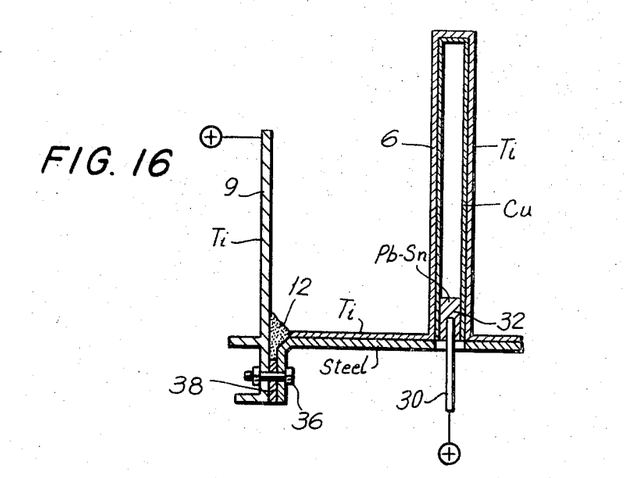
FIG. 16 is a fragmentary sectional elevation showing details of the structure of the invention.

Copper is advantageously deposited by electrodeposition upon the inner walls to obtain an intimate contact Ti-Cu, which permits better distribution of the current; such intimate contact may also be carried out for zinc, quite as efficiently, or with any other metal which is a good conductor of electricity and which may be deposited by electrodeposition, for instance nickel or chromium. The empty innerpart receives afterwards the conducting wire 30 which brings the current in, such conducting wire being embedded in a metal body 32 of low melting point which is also a good conductor of current.

Other preliminary processes provide a similar result; for instance it is possible to project or compress titanium upon a copper tube, or to fix copper upon a surface of titanium, which afterwards would be bent so that only titanium on the outside is placed in contact with the solution. In all these cases, copper may be replaced by zinc, or by another metal such as nickel and chromium. In the case of an anodic electrodeposition, more particularly for manganese dioxide, the deposit is formed on a support; this improves the adherence, and renders the operation more regular.

Preferably, the anodes are kept at a certain distance below the level of the solution, in order not to disturb the hydraulic currents inside the cell and in order to facilitate the use of a heat insulator, such as paraffin, on the surface of the bath.

Anodic surfaces which are not plane are preferably used with a view to increasing the outer surface of the deposit which is progressively and systematically formed, thus developing a larger working zone. This is best obtained with a circular section; it permits reduction of the titanium surface. Such deposit has a crown shape which has a better adherence and has a tendency to increase in a more regular manner than a flat surface deposit.

Various processes are known for developing, producing and maintaining important hydraulic currents which ensure a frequent renewal of the solution which is in direct contact with the surface of electrolysis. In electrolyses requiring a supply of heat, the currents are generated by injection of steam inside inclined pipes 1 (FIG. 1): the displacement of the liquid is explained by the known principle of emulsion formation ("air-lift"); a localized heating, inside suitable tubes upon the walls thereof, leads in fact to the same result. If on the contrary it is necessary to cool the bath, compressed air is advantageously used instead of steam.

The inner currents may also be developed by suitably using the gases which escape during the electrolysis, in accordance with the principle of emulsion. This is obtained by surrounding the transmitting electrode concerned, by a tube or diaphragm 5 (FIG. 2) (allowing the passage of the electric current) along part of its height, and halting it of course underneath the level of the solution.

It is also possible to obtain the same result with a hollow electrode (FIGS. 11–13), a portion of the inner surface of which transmits gases, thanks to large openings 16 and 18 symmetrically provided to allow a passage to the lines of force; such openings are not provided from a certain level upwards so that the upper part of the electrode works as an air-lift; openings 18 provided near the level of the solution ensure an outlet of the solution outside the conduit.

In the case of manganese dioxide production, it is the cathode which is affected by the escape of hydrogen. In various other electrolyses, the anode is the electrode affected by the escape of oxygen.

In a general manner, in the production of manganese dioxide, the conception, the carrying into effect and the conditions of working of the cell and of the electrodes are such as to sure a strong stirring, namely by:

working at a temperature higher than 95° C.,
doing away with all substantial plane surfaces inside the cell,
injecting steam,
preferential localized heating,
using anodes of hexagonal shape in a horizontal view,
enlarging the zones (in rhomboid shape in a horizontal view) formed by four adjacent anodes in order to facilitate hydraulic currents in a downward direction,
using the hydrogen which escapes at the cathode to ensure a circulation by emulsion (air-lift),
keeping the anodes at a certain distance below the surface of the bath as not to oppose the hydraulic currents and to improve the efficiency of an insulating layer which floats upon the surface of the bath,
improving the adherence of the deposit by various means (producing a deposit of annular section, resting upon a support, of slightly truncated conical shape, formed in a very regular manner) to avoid loosenings, which would distrurb the stirring of the bath and which would otherwise produce serious irregularities in the unitary surface amperages,
using various stirring devices at chosen points with the object of increasing hydraulic currents which are present in the bath,
using movable cathodes driven in a movement of rotation around their vertical axes (FIGS. 14 and 15) and producing important displacements of solution, thanks to the presence of suitable fittings,
using rotary cathodes (FIGS. 14 and 15) which are more or less spaced in the cell, and in which the suitable fittings produce hydraulic currents which are opposed but are at different levels, thus producing a strong flow and an efficient renewal of the solution in contact with the anodic surfaces,
using a cell or container means of cylindrical shape.

Figure 1:
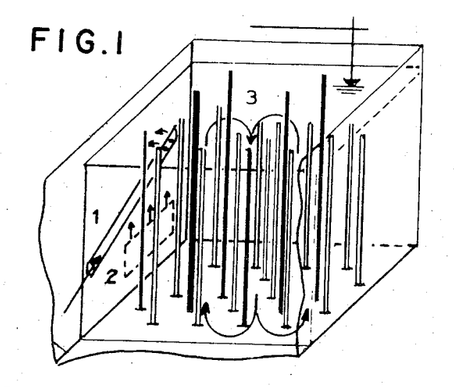
FIG. 1 is a fragmentary schematic perspective illustration of an apparatus according to the invention.

FIG. 1 shows means for producing hydraulic currents inside the container means, namely with steam injected in an inclined tube 1 or a localized electrical heating 2; the solution rises along the cathode in a zone 3, and comes down in the anode zones.

Figure 2:
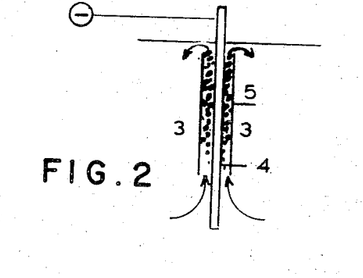
FIG. 2 is a schematic representation of the manner in which circulation of the bath is promoted.

In FIG. 2, the cathode 4 is surrounded by a tube 5 to facilitate an upward current of the solution in the zone 3. Tube 5 is fixed to unillustrated filaments which are fixed to top wall 8 to support tube 5.

Figure 3:
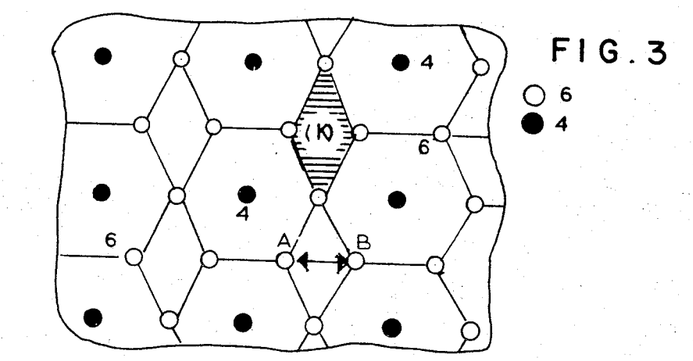
FIG. 3 is a schematic illustration of one arrangement of the anodes and cathodes with respect to each other.

FIG. 3 shows a regular hexagonal distribution of titanium anodes 6 and of the cathodes 4; the zones K are anodic zones where the solution moves in a downward direction; A–B shows the width of that zone. Thus the groups of anodes 6 define spaces K between themselves.

Figure 4:
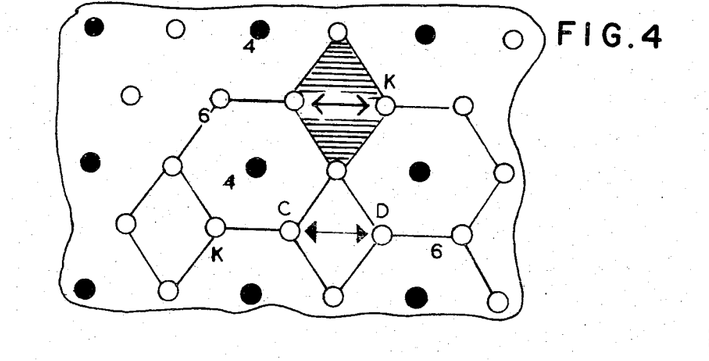
FIG. 4 is a schematic illustration of another arrangement of the anodes and cathodes with respect to each other.

FIG. 4 shows a distribution based upon a "stretched" hexagon in order to increase the width of the zone K: C–D is larger than A–B (see FIG. 3). This improves the working by increasing the zones of downward current.

Figure 5:
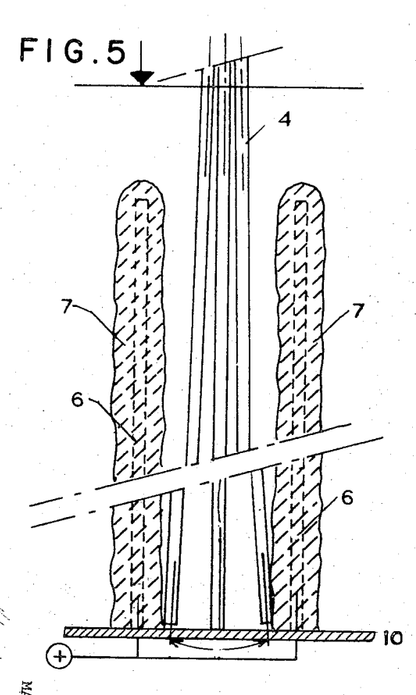
FIG. 5 is a schematic partly sectional elevation of a cathode and a pair of anodes with the electrolytic deposit on the latter.

FIG. 5 shows the position of the anodes 6 with the deposit 7 of $MnO_2$ and that of the cathode 4 with the admissible tolerance when placed in position. The anodes 6 are kept at a certain distance below the level of the solution and are fixed upon a support 10 forming the bottom of the cell.

FIG. 5 shows a horizontal section of the electrodes inside the cell, and the direction of the generated currents; "D" represents the tolerance for the fixation of the cathode; "K" is a typical space defined by anode groups; "X" shows a direction of current which is advantageously produced artificially, in order to renew the anodic solutions.

Figure 7:
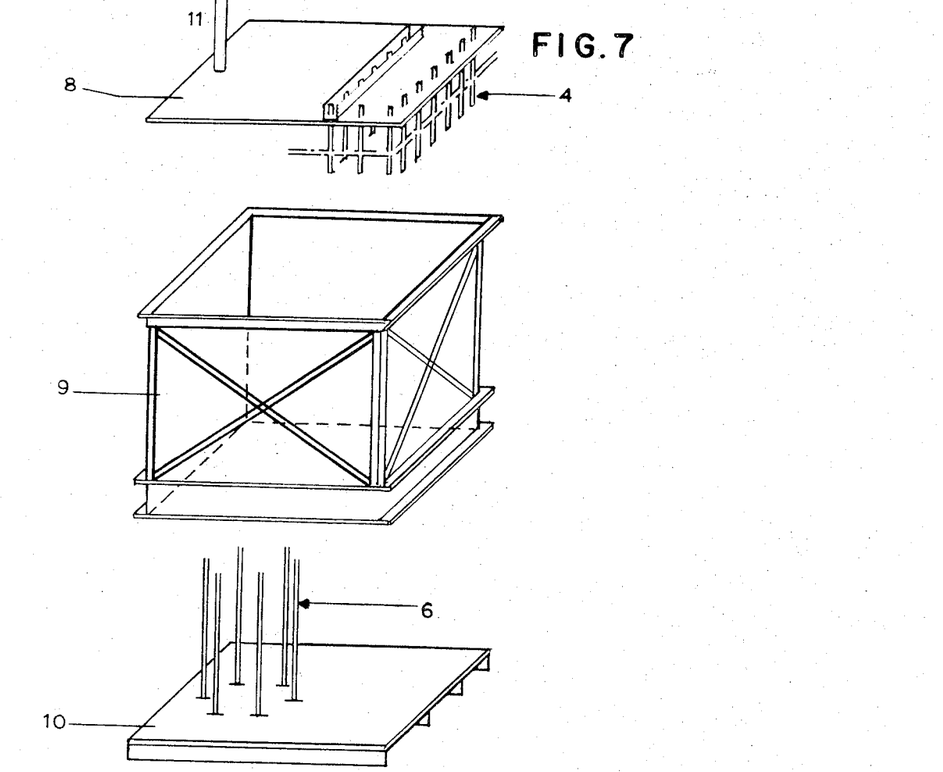
FIG. 7 is a schematic exploded perspective view of the container means and structure associated therewith.

FIG. 7 is a partial and exploded view of the container means and of the electrodes which shows cathodes 4 carried by the top wall 8 placed upon a parallelpiped 9 which is closed at the lower part by a very strong bottom 10, which acts as a support for the anodes 6. A conduit 11 is fixed onto lid 8 and receives the escaping gases; only a few cathodes and one hexagonal group of anodes have been illustrated so as to facilitate the reading of the drawing.

Figure 8:
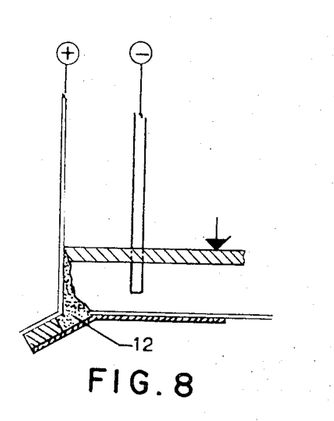
FIG. 8 shows schematically part of the structure in a sectional elevation.

FIG. 8 shows an additional safety joint 12 of $MnO_2$ for sealing any leakage through the inner joint.

Figures 9, 10:
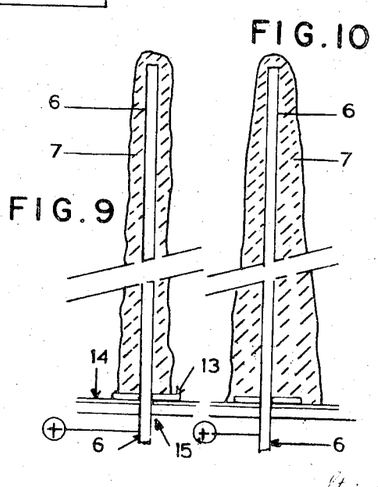
FIG. 9 shows a particular embodiment for connecting an anode to the bottom of a container.
FIG. 10 shows another arrangement.

FIG. 9 shows the positioning of the vertical anodes with a fixing support 13 intended to form a tight joint; electric insulators 14 for the upper part of the bottom and a conduit 15 penetrates through the bottom.

FIG. 10 shows a truncated conical shape of the deposit obtained by the process, thanks more particularly to the increasing presence of gas at the upper part of the cathode and on the lower part plate fixed upon the anodic tube; this ensures a better stability for the deposit.

Figure 11:
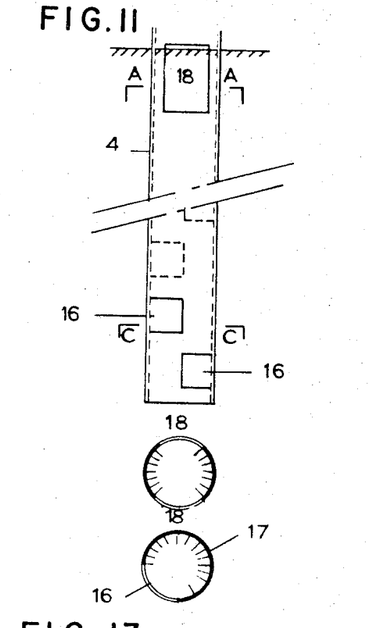
FIG. 11 is an elevation of the construction of a cathode which includes means for promoting circulation of the bath.

FIG. 11 shows a cathode 4 of circular shape and a circulating means including cathode wall portions formed with openings 16 provided upon the lower part in order to ensure an escape of gas inside the hollow or tubular cathode wall 17 thus producing an "air lift" in the upper part; silts 18 allow the solution to escape after it has moved upwards.

Figure 12:
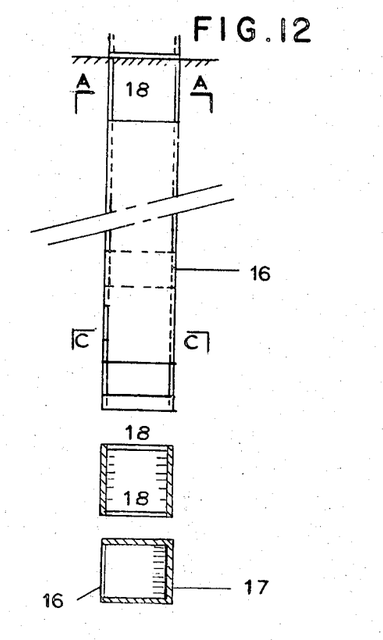
FIG. 12 is a schematic illustration of another construction of a cathode for promoting circulation of the bath.

FIG. 12 shows a cathode of square shape.

Figure 13:
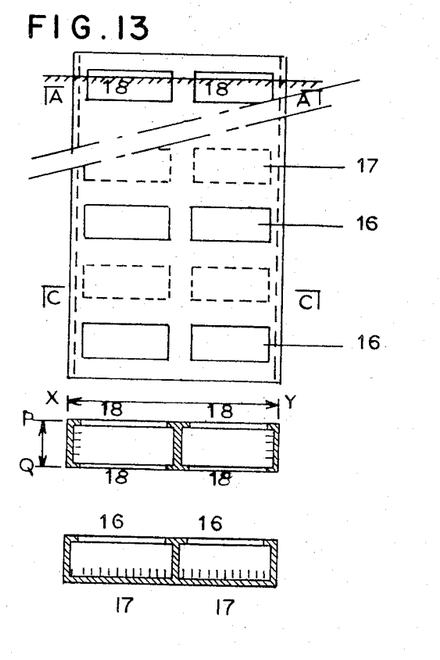
FIG. 13 is an illustration of a still further construction of a cathode for promoting circulation of the bath.

FIG. 13 shows the application of the same principle to hollow cathodes which are not square or circular but are rectangular; the illustration is diagrammatical, the scales are variable, and the distance X–Y may be appreciably greater than the distance P–Q; the number of chambers (two in FIG. 13) may be greater.

Figure 14:
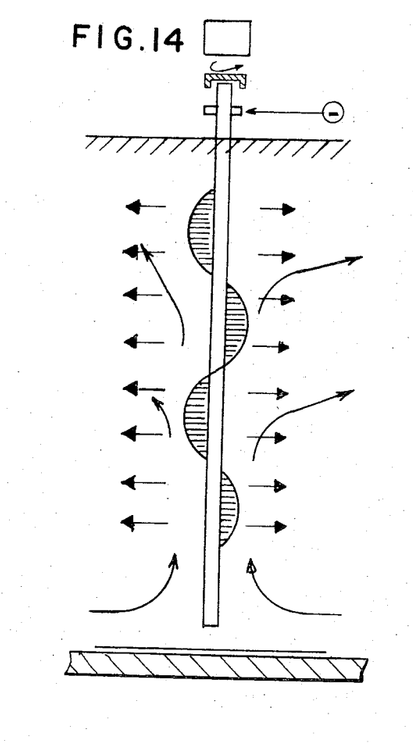
FIG. 14 illustrates how cathodes can be constructed so as to create a positive circulation of the bath.

FIG. 14 shows a movable cathode having a circulating means formed by a helicoidal vane fixed to the cathode; that cathode is extended to the outside of the bath in a movement of rotation; the solution is driven from the cathode by the helix and rises from the bottom of the bath.

Figure 15:
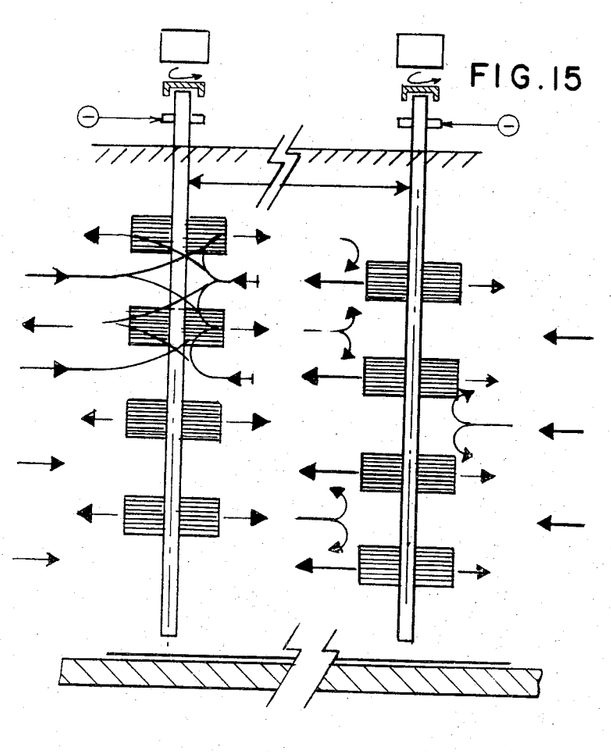
FIG. 15 is yet another illustration of the manner in which cathodes may be constructed in order to promote circulation of the bath.

FIG. 15 shows a combination of two rotary cathodes ensuring good flows of variable directions as a function of the height inside the bath.

FIG. 16 fragmentarily illustrates part of the container means of the invention. Thus it will be seen from FIG. 16 that the side wall of the container means is made of titanium while the bottom wall 10 is made of a sheet of steel covered with titanium. The anodes 6 are in the form the hollow titanium tubes which are closed at their top and which are integral with the sheet of titanium which is bonded to and covers the steel sheet forming the base of the bottom wall 10. As is clearly shown in FIG. 16, the inner surface of the anode 6 is lined with a layer of copper so as to provide the electrical conductivity which is required, and bonded to the inner surface of the copper is the plug 32 of an alloy of lead and tin which is previously cast on the conductor 30 through which the anode is connected to the positive pole of the source. As is indicated in FIG. 16 the side wall of the container means which is made of titanium is also connected to the positive pole. It will be noted that the side wall and bottom wall of the container means are fixed to each other as by bolts 36 with a suitable seal 38 situated between the downwardly directed flange at the exterior of the bottom wall 10 and the lower end region of the side wall 9. In addition, the junction between the bottom wall and side wall is closed by the seal 12 of manganese dioxide so as to reliably prevent any possible leakage. It will be noted that with this arrangement the bottom wall 10 and the anodes carried thereby can readily be removed from the remainder of the container means after the bolts 36 are removed.

The positive potential which is applied to the side walls of the container means is sufficient to render the tank walls slightly positive in order to avoid passivation of the titanium.

With an apparatus of the invention as described above a charge is introduced consisting of an aqueous solution of manganese sulfate at 100 gr./liter heated to a temperature of 98° C.

The electrolysis is carried out at an average amperage of 0.65 A./dm.$^2$ on the anodes and 0.15 A./dm.$^2$ on the walls. The duration of the electrolysis is of 65 days. At the end of that period, the percentage of Mn in the bath has fallen to about 35 gr./liter and the percentage of sulphuric acid has risen by about 2 gr./liter to about 160 gr./liter. That acid solution is used at the beginning of the cycle of manufacture in the leaching stage.

At the end of the electrolysis the bottom is removed and upon that bottom there is the dioxide of manganese which had been deposited upon the anodes.

The dioxide of manganese is in the form of a solid, coherent mass adhering to the anodes and to the bottom. The block thus formed is sent to the appropriate section of the works where the dioxide of manganese is removed either by a thermal shock, or by an explosive under water, or by some other mechanical means, care being taken not to deteriorate the anodes.

The product thus recovered is crushed and washed for shipping.

Figure 17:
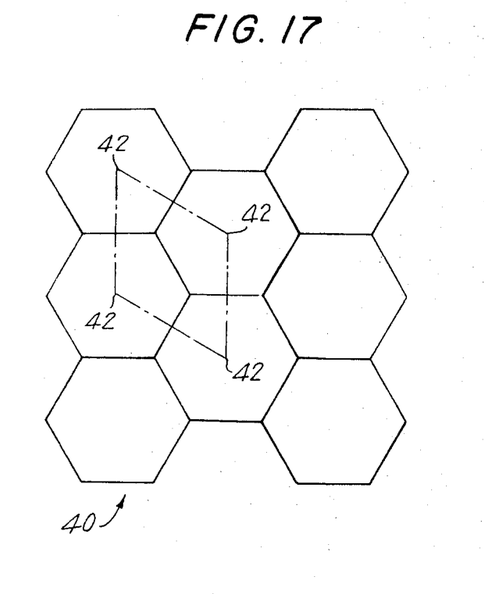
FIG. 17 is a schematic illustration of a conventional honeycomb arrangement.
Figure 18:
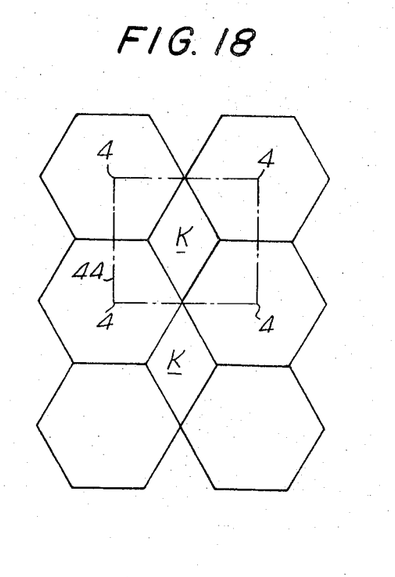
FIG. 18 is a schematic illustration of the arrangement of the anodes and cathodes of the invention, illustrating how it differs from the honeycomb arrangement of FIG. 17.

As is apparent from the above description, in a plane which is normal to the anodes and cathodes, the cathodes are situated at the centers of hexagons described in the latter plane with the anodes situated at the corners of the hexagons. However, it is to be noted that this arrangement is not a conventional honeycomb arrangement. Thus, a conventional honeycomb arrangement 30 is shown in FIG. 17. It will be noted that the centers 42 of the adjoining hexagons of the honeycomb describe a rhombus. In contrast, with the arrangement of the invention, which is illustrated in FIG. 18, the centers of the hexagons, respectively occupied by the cathodes 4, when interconnected, as shown by the dot-dash line 44 form a square or rectangle. In this way with the arrangement of hexagons according to the invention there is defined between the groups of anodes the spaces K in which the liquid can flow downwardly before flowing upwardly along the cathodes so as to provide the circulation according to the invention.

The objects in view for the manufacture of electrolytic $MnO_2$ are mainly:

the possibility of considerably increasing the unitary amperage (A./dm.$^2$) accepted by the titanium without any risk of passivation, or of appreciably reducing that risk;

a production P of the cell which is distinctly higher; in the particular case of $MnO^2$, that production P is considerably increased ("P" represents the number of grams of $MnO_2$ deposited as an average per hour and per dm.$^2$ of anode surface of Ti):

a product which is purer or better;

savings of electric current by a reduction of the various inner resistances;

an increase of the exhaustion of the bath, thus reducing accordingly the equipment required for the dissolution and for purification, and also the consumption of heat; easy removal of the anodic deposits.

All these objects may or may not have a direct relation with other processes of electrolysis than that of $MnO_2$.

Extensive searches have shown the essential problems which are met in the production of electrolytical $MnO_2$ of high quality. The following may be more particularly cited;

the utilization of titanium as an anodic material avoiding passivation;

the advantage of obtaining a good adhering deposit; loosenings result in localized super-amperages; therefore, there are risks of passivation upon the surface affected;

the difficulty of ensuring a good passage of current, as well on the inlet side upon the titanium anode as in the body of the latter, and on the outlet surface where the manganese dioxide is deposited;

the enormous importance of stirring (mainly ionic) of the bath, in order to systematically renew the solution in direct contact with the anodic surface;

the possible systematic increase of the total amperage if the contact surface of the anodic deposit with the solution increases regularly in an appreciable manner;

the improvement of one factor carries almost always with it other indirect gains; for instance, a better adherence of the deposit allows raising the upper limit of the concentration in acid and the ratio of exhaustion of the solution in manganese, but also the unitary amperage, since this reduces the risks of loosenings which sometimes cause a local passivation, owing to a very high unitary amperage at the surface of the Ti in contact with the solution.

The present invention provides solutions to each of these problems, these solutions being taken separately or in various combinations, the solutions being capable of application in general to processes of electrolysis, and more particularly to the manufacture of manganese dioxide by electrolysis.

An intimate contact of copper upon titanium is particularly advantageous for the present invention:

It ensures the passage of electric current in the best possible manner. This is obtained by electrodeposition; the surface of the Ti to be coated with Cu is used as a cathode and an electrode of Pt acts as the anode; the solution is basically a water solution, with an electrolyte such as sulphuric acid. In this electrolysis of water, the escape of hydrogen upon Ti frees or reduces the oxides of Ti. After a certain time, $CuSo_4$ in solution is added to the solution, which leads to cathodically deposited copper upon the cleaned surface of titanium; the contact Cu-Ti obtained is intimate and is therefore an excellent conductor of electricity.

In the case of manganese dioxide it may be interesting to replace copper by zinc, the latter not being considered as a serious poison. The principle remains the same, the working conditions should simply be adapted. Also, copper or zinc may be replaced by other metal-saving equivalent characteristic from the point of view of conductivity of the current and electrodeposition upon titanium. Afterwards, and with a view to simplifications, the copper alone will be mentioned. This electrolysis is carried out very easily in tubes which are closed at one end and by means of certain preparations upon any Ti surfaces.

The object in view is to reduce the thickness of the layer of titanium to the indispensable minimum and, thanks to the copper deposited, to distribute the electric current as near as possible to the surface of titanium, thus ensuring anodically the electrolysis in the production cell.

A fundamental and original point of the process is to generate an intimate and important contact of titanium with copper, as near as possible to the anodic electrolysis surface. This is true as well for tubes as for plates made with two treated faces which are placed against each other and the core of which would therefore be made of copper. This process allows therefore the use of a good conductor of electricity, such as copper, without risking a pollution of the bath since it is completely surrounded by Ti.

The inlet of electric current is carried out in various ways, either by immersing the inlet cable in a powder of Cu, or graphite, or of these two components, or also by casting a metal or a metal alloy 32 (FIG. 16) ensuring a good contact on the electrolytic deposit of copper and on the cable 30 for the admission of the current. An alloy Pb-Sn has the advantage of a low melting point (about 200° C.), which simplifies the technological problems.

The final closing of the tube is obtained by casting pitch, in order to avoid all inner corrosion.

The cathodic use of titanium in water electrolysis permits cleaning its surface, thus improving the adherence of a metal which is fixed thereto by electrodeposition. Such a cathode preparation is also useful before projecting copper upon the titanium, in order to arrive to a good contact Cu-Ti; such projection of Cu upon Ti is another means of obtaining a fairly intimate contact of Cu upon Ti.

In fact, in the electrolysis of manganese dioxide, the cathodically treated titanium is advantageous: the $MnO^2$ deposit is better retained and the passage of the current during the entire cycle of the electrolysis is facilitated.

The surfaces of Ti which work anodically may also be periodically regenerated by such cathodic preparation.

Moreover, if the surface of the titanium has been passivated for any reason whatever, a cathodic preparation permits restoring it to good condition.

All these cathodic preparations consist in utilizing the affected surface in water electrolysis as a cathodic zone, to which a suitable electrolyte has been added, namely sulphuric acid. The duration and operating conditions of such a preparation depend on the importance of the work required.

Hydraulic currents may be generated from the cathode by application of the principle of air-lift, the gas being the liberated hydrogen. As previously mentioned, this may be carried out by means of a diaphragm, or by means of a hollow cathode of any shape, the gas produced at the lower zone passing rapidly into the conduit of the upper part.

These hydraulic currents may also be formed by rotation of a cathode, by means of a small driving group placed upon the upper lid; the cathode is provided with blades, fins or helicoidal surfaces, or designed in another manner, to produce hydraulic currents moving away from the cathodic surface and which renew the solution placed in intimate contact with the anodic surfaces.

Mechanical stirrers immersed in the solution may generate and maintain inner currents, for the operation of the cell.

Figure 6:
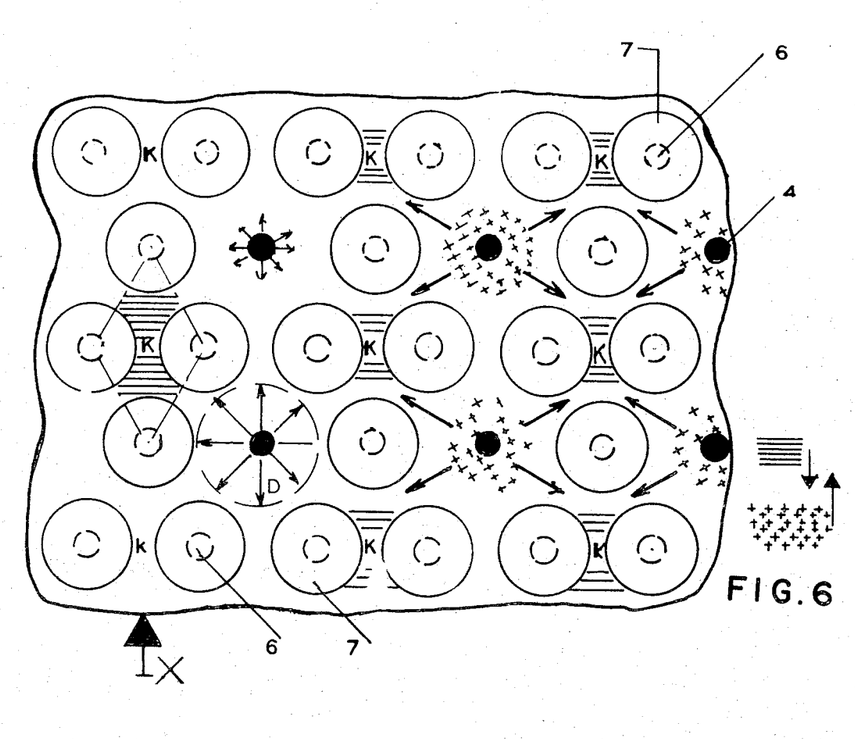
FIG. 6 is a schematic illustration of the manner in which the apparatus operates.

The stirring devices are preferentially placed:

either at the upper part, above the anodic zones marked "K," by generating there a current in a downward direction;

or near the side walls in order to generate currents along directions which are always defined with the object of renewing the solution in contact with the anodic surfaces (see FIG. 6, direction X).

What is claimed is:

1. In an apparatus for electrolysis, container means for containing an electrolytic bath, said container means having top and bottom walls, a plurality of anodes carried by and extending upwardly from said bottom wall in the interior of said container means and a plurality of cathodes carried by and extending downwardly from said top wall in the interior of said container means, the number of anodes being greater than the number of cathodes, and said anodes being arranged in groups with each group of anodes being distributed around a single cathode, and said groups of anodes adjoining each other and defining between themselves predetermined spaces in which the bath is adapted to flow in one diretcion which is generally parallel to the anodes and cathodes while in the interiors of said groups the bath is adapted to flow in an opposite direction along said cathodes to provide continuous circulation of the bath with respect to the anodes and cathodes.

2. The combination of claim 1 and wherein said cathodes are situated substantially at the centers of said groups of anodes, respectively.

3. The combination of claim 2 and wherein each group of anodes are respectively located at the corners of a polygon described in a plane which is normal to said anodes.

4. The combination of claim 3 and wherein said polygons are arranged in one set of parallel rows in which each pair of adjoining polygons has a common side and in a second set of parallel rows perpendicular to said one set and in which the adjoining polygons have common corners, and said one set of parallel rows of polygons defining between themselves said spaces situated between the groups of anodes.

5. The combination of claim 4 and wherein said polygons are hexagons while said spaces between said groups of anodes have in said plane a diamond-shaped configuration.

6. The combination of claim 1 and wherein a circulating means coacts with said cathodes for promoting circulation of the bath upwardly along said cathodes, so that the bath will then flow laterally from said cathodes toward said groups of anodes and downwardly through said spaces defined between said groups before again reaching lower portions of said cathodes to flow again upwardly along said cathodes.

7. The combination of claim 6 and wherein said circulating means includes a tube surrounding and spaced from each cathode.

8. The combination of claim 6 and wherein said cathodes are themselves in the form of hollow tubes, and said circulating means being formed by portions of said hollow tubes which are formed with openings situated at lower and upper regions of said tubes so that the gas generated during operation will create upward flow of the bath along the interior of the tubes through the lower openings and out of the interiors of the tubes through the upper openings.

9. The combination of claim 6 and wherein said cathodes are carried by said top wall of said container means for rotary movement with respect thereto, drive means connected to said cathodes for rotating the same, and vanes carried by said cathodes for creating the circulation of the bath during rotation of the cathodes.

10. In an apparatus as recited in claim 1 and wherein said anodes are in the form of hollow tubes having top closed ends, said bottom wall of said container means being formed with openings through which the interiors of said tubular anodes communicate with the exterior of said container means, and electrically conductive means extending through said openings in said bottom wall into electrical connection with said anodes at the interiors thereof for supplying electricity thereto.

11. The combination of claim 10 and wherein each of said anodes is composed of an outer wall of titanium and an inner layer of metal of low electrical resistance lining said outer wall at the interior of each tubular anode.

12. The combination of claim 11 and wherein said inner electrically conductive layer is selected from the group consisting of copper, zinc, nickel, and chromium.

13. The combination of claim 11 and wherein said inner layer is copper.

14. The combination of claim 13 and wherein said electrical means connected to each anode includes a plug of low electrical resistance situated in the interior of each anode in engagement with the copper layer and a wire extending from said plug.

15. The combination of claim 14 and wherein said plug is made of an alloy of lead and tin.

16. The combination of claim 1 and wherein a means communicates with the interior of said container means for introducing steam into the bath.

17. The combination of claim 1 and wherein a heating means is carried by said container means in the interior thereof for elevating the temperature of said bath.

18. The combination of claim 1 and wherein said bottom wall is composed of a steel plate covered with a layer of titanium, and said anodes being in the form of titanium tubes which are integral with said layer of titanium.

19. The combination of claim 17 and wherein said bottom wall is formed with openings aligned with the hollow interiors of said anodes and through which the anodes communicate with the exterior of the container means, said titanium tubes being lined at their interior with copper, and electrical means extending through the openings in the bottom wall and engaging the copper at the interior of the anodes for connecting the latter to a source of electricity.

References Cited
UNITED STATES PATENTS
3,04,083   10/1968   Kircher _____________ 204—272

HOWARD S. WILLIAMS, Primary Examiner
W. I. SOLOMON, Assistant Examiner

U.S. Cl. X.R.
204—96, 242, 273, 274, 277, 278